(12) United States Patent
Levy et al.

(10) Patent No.: US 9,582,441 B2
(45) Date of Patent: Feb. 28, 2017

(54) CLOCKLESS SERIAL SLAVE DEVICE

(71) Applicant: Infineon Technologies AG, Neubiberg (DE)

(72) Inventors: David Levy, Wernberg (AT); Gerhard Pichler, Ferndorf (AT)

(73) Assignee: Infineon Technologies AG, Neubiberg (DE)

( * ) Notice: Subject to any disclaimer, the term of this patent is extended or adjusted under 35 U.S.C. 154(b) by 166 days.

(21) Appl. No.: 14/192,172

(22) Filed: Feb. 27, 2014

(65) Prior Publication Data

US 2015/0242348 A1    Aug. 27, 2015

(51) Int. Cl.
| | |
|---|---|
| *G06F 3/00* | (2006.01) |
| *G06F 13/372* | (2006.01) |
| *G06F 1/06* | (2006.01) |
| *G06F 1/10* | (2006.01) |
| *G06F 13/42* | (2006.01) |
| *G06F 1/04* | (2006.01) |

(52) U.S. Cl.
CPC .............. *G06F 13/372* (2013.01); *G06F 1/04* (2013.01); *G06F 1/06* (2013.01); *G06F 1/10* (2013.01); *G06F 13/4282* (2013.01); *G06F 13/4291* (2013.01)

(58) Field of Classification Search
CPC ........................................................ H04L 7/00
USPC .......................................... 710/313; 375/354
See application file for complete search history.

(56) References Cited

U.S. PATENT DOCUMENTS

| | | | | |
|---|---|---|---|---|
| 7,228,373 | B2* | 6/2007 | Daly | .................. G06F 13/4256 710/104 |
| 7,584,305 | B2* | 9/2009 | Hsieh | .................... G06F 13/102 710/110 |
| 7,689,740 | B2* | 3/2010 | Chou | .................. G06F 13/4286 710/36 |
| 2008/0109582 | A1* | 5/2008 | Chen | ................... G06F 13/4291 710/61 |
| 2011/0122978 | A1* | 5/2011 | Peichel | ................. H04L 7/0008 375/354 |

OTHER PUBLICATIONS

Wikipedia.org. "Serial Peripheral Interface." Last modified on Feb. 26, 2014. 12 Pages.

* cited by examiner

*Primary Examiner* — Titus Wong
(74) *Attorney, Agent, or Firm* — Eschweiler & Potashnik, LLC

(57) ABSTRACT

Various methods and devices involving a slave device are discussed. The slave device, which may be without a clock input, receives a clock message and generates a clock based on the received clock message. In some embodiments, the slave device receives a further clock message and transmits a confirmation message simultaneously with receiving the further clock message. In other embodiments, determining a clock may comprise sampling the clock message with an internal system clock and providing the clock based on located edges. Other techniques are also discussed.

18 Claims, 3 Drawing Sheets

CLOCKLESS SERIAL SLAVE DEVICE

TECHNICAL FIELD

The present application relates to slave devices receiving a serial data signal without receiving a clock signal, also referred to as "clockless" devices in the following. Furthermore, the present application relates to corresponding master devices and systems and to methods applicable in such devices and systems.

BACKGROUND

Serial data transmission is widely used for communication between devices. A serial communication interface frequently used is the so-called serial peripheral interface (SPI), which may for example be used in automotive applications for communication between nearby devices. For example, it may be used to retrieve sensor data. A very similar serial system is known under the name Microwire.

In conventional SPI systems, an SPI master supplies each of a plurality of SPI slaves with a clock signal. Based on this clock signal, also referred to as SPI clock, data communication between master and slaves is performed. Each slave may communicate with the master during assigned time slots.

The SPI clock signal toggles at the highest available data rate provided by the serial connection in such systems. Therefore, the SPI clock is a limiting signal regarding capacitive load and is furthermore a major contributor to electromagnetic emissions. An amount of slaves in such a system may be limited by a capacitive load on a clock line and/or by such emissions.

For example, in an automotive application increasing an amount of sensors which constitute slaves in a car may bring the serial peripheral interface to its data rate limit, as for each slave a time slot for transmission has to be assigned and therefore with a constant clock rate the data rate available per sensor may decrease with increasing number of sensors. On the other hand, increasing the clock rate may not be possible due to the above-explained effects.

While such constraints may be overcome by completely redesigning the communication system used, for example by using both edges of the clock signal for transmission of data or by dithering the clock signal, such approaches may for example require a significant modification of a master device used, which is undesirable in some circumstances. Also, a redesign of the communication system may be detrimental to backward compatibility with legacy devices, for example conventional SPI devices.

DETAILED DESCRIPTION

In the following, various embodiments will be described in detail with reference to the attached drawings. It is to be noted that these embodiments serve illustrative purposes only and are not to be construed as limiting the scope of the present application. For example, while embodiments may be described as comprising a plurality of features or elements, in other embodiments some of these features or elements may be omitted, and/or some of these features or elements may be replaced by alternative features or elements. In yet other embodiments, additional features or elements may be provided. Furthermore, features or elements of different embodiments may be combined to form further embodiments.

Some embodiments relate to communication via a serial interface. A serial interface may be an interface where data is sent or received one bit after the other, for example as a series of signal values corresponding to either a logic 1 or a logic 0. For illustrative purposes, the serial peripheral interface (SPI) will be used as an example for a serial interface in some of the embodiments described hereinafter. However, techniques disclosed herein may also be applied to serial interfaces other than the SPI interface e.g. Microwire systems.

In some embodiments, a serial slave device is provided which comprises a clock recovery engine to recover a clock based on a received clock message, which may be received at a data input. For such a slave device, no clock input is needed. Therefore, in embodiments, a number of pins of the slave device may be reduced, and/or a clock line to the slave device may be omitted. Omitting the clock line may lead to a reduced electromagnetic emission and/or to a reduced capacitive load on the clock line. In embodiments, such a communication system using such slave devices may support more slave devices and/or higher data rates than conventional systems. Furthermore, in embodiments omitting the clock line to the slave device allows omitting a pin of the slave device which otherwise would be used to receive the clock signal. This may allow to reduce the package size in some embodiments, leading to reduced costs.

In such systems, slave devices as mentioned above may be used alone or together with conventional slave devices using a clock input.

A master usable in such a system in an embodiment may be configured to send a specific message as clock message on a data line which enables clock recovery in the slave device. In some embodiments, such a message may comprise alternating values of "0" and "1".

Figure 1:
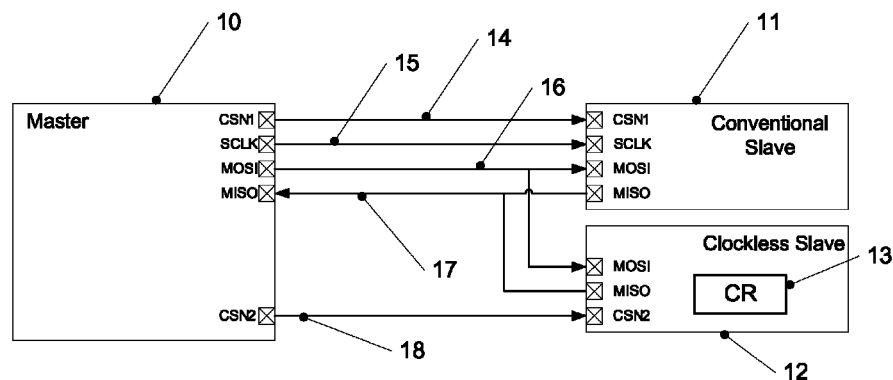
FIG. 1 is a diagram illustrating a serial communication system according to an embodiment.

An illustrative, non-limiting example of a system according to an embodiment is shown in FIG. 1. The system illustrated in FIG. 1 is a serial peripheral interface (SPI) system having a master device 10 and slave devices 11, 12. As will be explained in more detail, slave device 11 is a conventional slave device having a clock input SCLK to receive a clock signal from master device 10 via a clock line 15, whereas slave device 12 is a slave without a clock input, also referred to as "clockless slave" herein. While one conventional slave device 11 and one clockless slave 12 are shown in FIG. 1 for illustration purposes, in other embodiments any other number of conventional slave devices 11 and clockless slave devices 12 may be used in any desired combination.

Furthermore, each slave device 11, 12 is coupled with master device 10 with a dedicated chip select line 14, 18, respectively, corresponding terminals being labeled CSN1 for slave device 11 and CSN2 for slave device 12. Using the chip select lines 14, 18, master 10 informs slave devices 11, 12 when they may send data to master device 10. Via the chip select line, master device 10 may also indicate to slave devices 11, 12 when master device 10 may send data to the respective slave device.

For sending data from slave devices 11, 12 to master device 10, a line 17 is provided, also referred to as MISO line (master in slave out). Conversely, for sending data from master device 10 to slave devices 11, 12, a line 16, also referred to as MOSI line (master out slave in), is provided.

To obtain a clock for sending and receiving data to and from master device 10, clockless slave device 12 comprises a clock recovery (CR) engine 13. Clock recovery engine 13 may be implemented in hardware, software, firmware or any combination thereof, for example by programming a processor device of slave device 12 accordingly.

Apart from the fact that slave device 12 does not receive a clock signal from master 10 and mechanisms for clock recovery associated therewith which will be described in the following with reference to FIGS. 2-5 in more detail, in some embodiments the system of FIG. 1 may operate like a conventional SPI system, and any techniques conventionally known from such conventional SPI systems may be employed in the embodiment of FIG. 1 and will therefore not be described in more detail. However, as already mentioned in other embodiments other types of serial data communication systems than SPI systems may be used.

Figure 2:
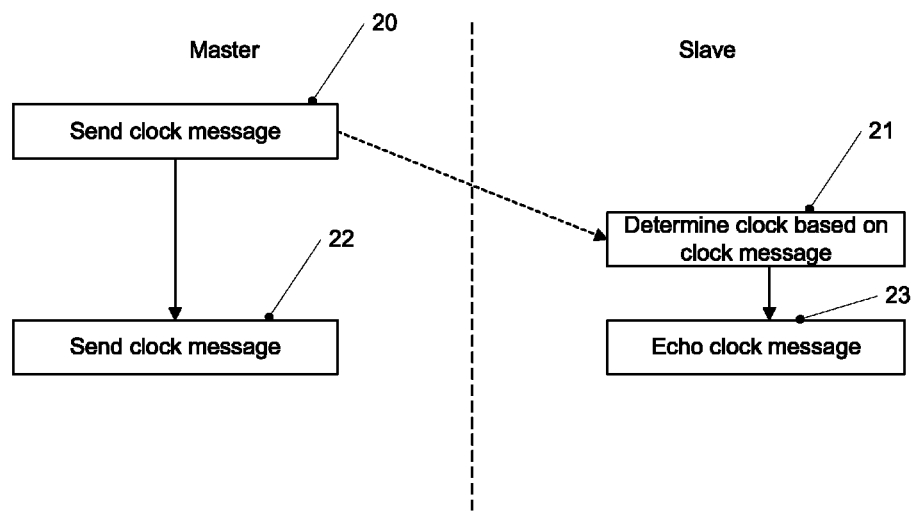
FIG. 2 is a flowchart illustrating a method according to an embodiment.

In FIG. 2, a method according to an embodiment related to clock recovery in a slave device which does not receive a clock signal from a master is shown. The method illustrated in FIG. 2 may for example be implemented in the system of FIG. 1, in particular in communication between master device 10 and clockless slave device 12, but may also be implemented in other systems. For illustration purposes, on the left side of FIG. 2 under a heading "master" actions performed in a master device are illustrated, whereas on the right side under a heading "slave" actions performed at a slave device are illustrated.

At 20, a master device sends a clock message to a clockless slave device. The clock message may be a specific message sent over a line usually used for data transmission, for example via MOSI line 16 of FIG. 1. In some embodiments, the clock message may comprise alternating values corresponding to logic 0 and to logic 1.

At 21, the slave determines a clock based on the clock message sent by the master at 20.

After some time, for example in a next time slot assigned to the particular clockless slave, the master may repeat the clock message at 22. In response thereto and for example essentially at the same time, for example in the same time slot, the slave may also send the clock message (which may also be referred to as echoing the clock message) at 23. When the master receives the echoed clock message, the master knows that the slave has recovered the clock information successfully and may then proceed to transmit and receive data to and from the slave, the slave using the recovered clock.

It should be noted that while in the embodiment of FIG. 2 the clock message is sent twice by the master at 20 and 22, in some embodiments the master may continue sending the clock message in regular or irregular intervals until the clock message is echoed, i.e. until the slave indicates that it has successfully recovered the clock message. It should also be noted that instead of echoing the clock message, in other embodiments the slave may send another type of confirmation message that it has recovered the clock successfully.

Figure 3:
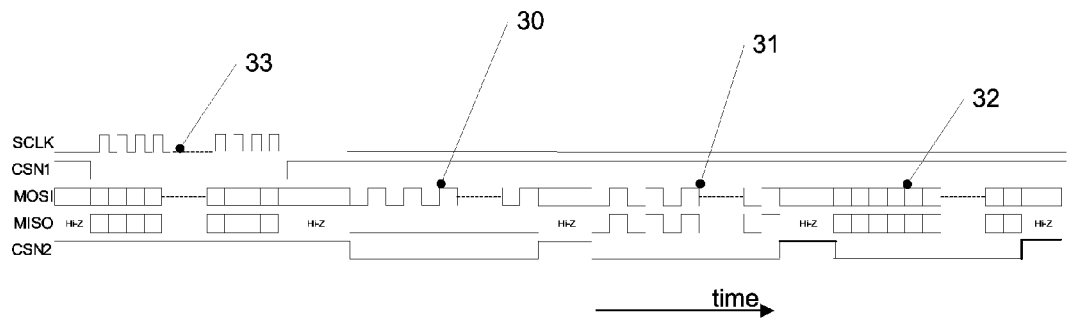
FIG. 3 is a signal diagram showing example signals for illustrating the embodiment of FIG. 2.

To further illustrate the embodiment of FIG. 2, in FIG. 3 signals which may be transmitted in a system like the system of FIG. 1 when performing the method of FIG. 2 are shown.

It is to be emphasized that the signals serve only for further illustration and are not to be construed as limiting. In particular, in other embodiments other signal waveforms, signals sent to more than two slaves simultaneously or other kinds of signals may be used.

In a first line of FIG. 3, a clock signal which may be provided on a clock line, for example clock line 15 of FIG. 1, to supply conventional slaves with a clock signal is shown. In the second line labeled CSN1, a chip select signal for a first (conventional) slave, for example slave 11 of FIG. 1, is shown. In a third line labeled MOSI, a signal sent from a master device to slave devices is shown, and in a fourth line labeled MISO signals from slave devices to the master device are shown. In a fifth line labeled CSN2, a chip select signal for activating communication with a second slave device which in the illustrative example shown is a clockless slave device, for example clockless slave 12 of FIG. 1, is illustrated.

With the chip select signals of FIG. 3, a transition from a high signal level to a low signal level, i.e. a falling edge, indicates the beginning of an active period, and a corresponding rising edge indicates the end of the active period. For example, in phase 30 the clock message starts to be recorded or received by the second slave with the falling edge of CSN2 and is completed with the rising edge of CSN2.

In a first phase 33, CSN1 is asserted, indicating that the master device communicates with the first (conventional) slave device, and CSN2 is not asserted. In this phase, the clock signal SCLK is supplied to a clock line, and via MOSI and MISO lines conventional data communication between master device and slave device occurs. Arbitrary data is symbolized by squares in FIG. 3.

In further phases 30, 31 and 32 CSN1 is not asserted, and CSN2 is asserted, indicating that in these phases the master device communicates with the second slave device, i.e. a clockless slave device. While phases 30, 31 and 32 in FIG. 3 are depicted as immediately following each other, between these phases communication with other slave devices, for example with the first slave device, may occur in some embodiments.

In phases 30, 31 and 32 no clock signal is supplied to the clock line (as it would not be received by the "active" slave activated by chip select signal CSN2). Not transmitting a clock signal in some embodiments may reduce electromagnetic interference and/or capacitive loads. Furthermore, not transmitting a clock signal in some embodiments allows for omitting a clock pin at the clockless slave device. With one pin less needed, in some embodiments a package size may be reduced, leading to reduced costs.

In phase 30, on the MOSI line the master device sends a clock message to the slave device. In the embodiment of FIG. 3, alternating values of 0 and 1 are sent, i.e. the signal toggles between two values. It should be noted that in case of SPI signals a frequency of this toggling is half of the frequency of the clock signal conventionally supplied on the clock line (for example as shown in phase 33), as generally rising edges of the clock signals are used as a basis for receiving or transmitting data in conventional SPI systems. Therefore, the maximum toggle rate during phase 30 is determined by the data signal and not by the clock signal and, in the example of FIG. 3, is the toggling rate of the clock signal on SCLK, also referred to as SPI clock in case of SPI systems.

For example, in a 16-bit SPI system the clock message may have the form 0X5555, or for a 32-bit SPI the form 0X55555555. Each digit "5" represents the hexadecimal value of four bits, i.e. 0101. In other embodiments, other messages may be used.

Based on the clock message the second slave receives during phase 30, the second slave recovers the clock, i.e. generates internal information when to sample incoming data on the MOSI line and when to output data on the MISO line.

In phase 31, the chip select line CSN2 again is asserted, and the master device again sends the clock message to the second slave device. As in the example shown the second slave device has recovered the clock, also in phase 31 it also sends the clock message, which may be referred to as echoing. In this way, the master device is informed that the second slave device has recovered the clock successfully. In other embodiments, other acknowledgment signals may be used.

After this acknowledgment, in phase 33 where CSN2 again is asserted data transmission between master device and the second slave device may be performed based on the recovered clock.

As already mentioned, in case the second slave device does not successfully recover the clock signal during phase 30 and therefore does not echo the clock message in phase 31, the master may continue transmitting the clock message for example up to a predetermined maximum number of times until the second slave successfully recovers the clock and echoes the clock message.

It should be noted that while for illustrative purposes in FIG. 3 only communication with a first (conventional) slave device and a second (clockless) slave device is shown, similar signals may be sent to and received from further conventional or clockless slave devices.

Next, with reference to FIG. 4 an embodiment of a clock recovery method based on a clock message as for example shown and explained with reference to FIGS. 2 and 3 according to an embodiment will be described. While the method of FIG. 4 may be used to implement 21 of FIG. 2, the method of FIG. 4 may also be used independently from the method and techniques of FIG. 2.

At 40, a slave device (for example clockless slave 12 of FIG. 1) receives a clock message from a master device. The clock message may comprise alternating values corresponding to logic 0 and logic 1, for example 0X5555 for a 16-bit SPI system or 0X55555555 for a 32-bit SPI system.

At 41, during the receiving of 40 this clock message is "sampled" with a system clock of the slave device. The system clock of the slave device in the embodiment of FIG. 4 has a higher clock frequency than a clock frequency of a clock used for data transmission in the system, for example the clock signal transmitted via line 15 in FIG. 1 (also referred to as data clock hereinafter). For example, a clock frequency of the system clock of the slave device may be al least 4 times s higher than a clock frequency of the data clock, for example at least seven 7 or at least 10 times higher, but is not limited thereto. At 42, edges are located in the sampled clock message, e.g. transitions from 0 to 1 or from 1 to 0. Based on the detection of edges at 42 or based on the sampling at 41, a length of one bit on the serial line may be determined in terms of cycles of the slave system clock, e.g. as corresponding to the distance between two edges.

The edges located at 42 may be used as a transmit clock for transmitting data from the slave to the master at 43. In some embodiments, prior to using the thus processed clock message for this purpose, it may be shifted to account for example for loop delays.

Furthermore, the processed clock message generated at 42, i.e. the located edges, may be shifted backwards by approximately half the length of a bit of the serial data communication. For example, if the duration of a bit is seven cycles of the system clock of the slave device, the backwards shift may be by three or four such clock cycles. This shifted backwards version at 45 is then used as a receive clock, i.e. for sampling data received from the master device as close as possible to the middle of the bit. It should be noted that some inaccuracies in the shifting are acceptable, as the sampling usually needs not occur exactly in the middle of the bit. The starting point for the send clock or the receive clock in such an embodiment may be given by a chip select signal, for example by a falling edge thereof as already indicated.

By the clock recovery as outlined above, the sent clock may be recovered such that a sampling at the master device occurs approximately in the middle of bits. Also, with using the embodiment of FIG. 4, by the backwards shift at 44 the sampling of received data may occur approximately in the middle of each bit received.

In an embodiment, the method illustrated with respect to FIG. 2 and/or 4 may be repeated periodically or non-periodically, for example to account for a drift of the clock. In some embodiments, to achieve this the master device may send a special command to the slave device to announce that now a clock message is send, to prevent the slave device from confusing the clock message with a regular data frame.

Figure 4:
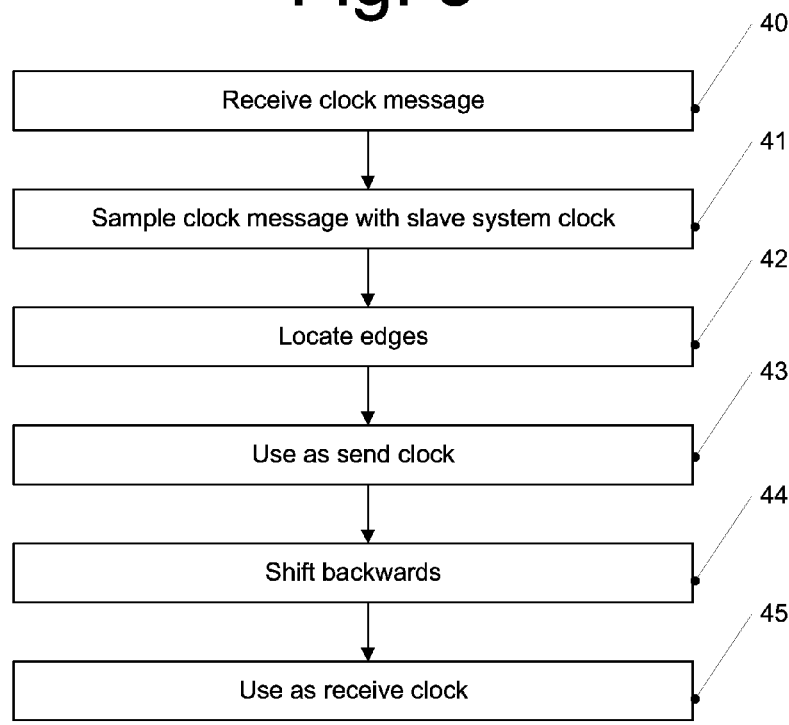
FIG. 4 is a flowchart illustrating a method for clock recovery according to an embodiment.
Figure 5:
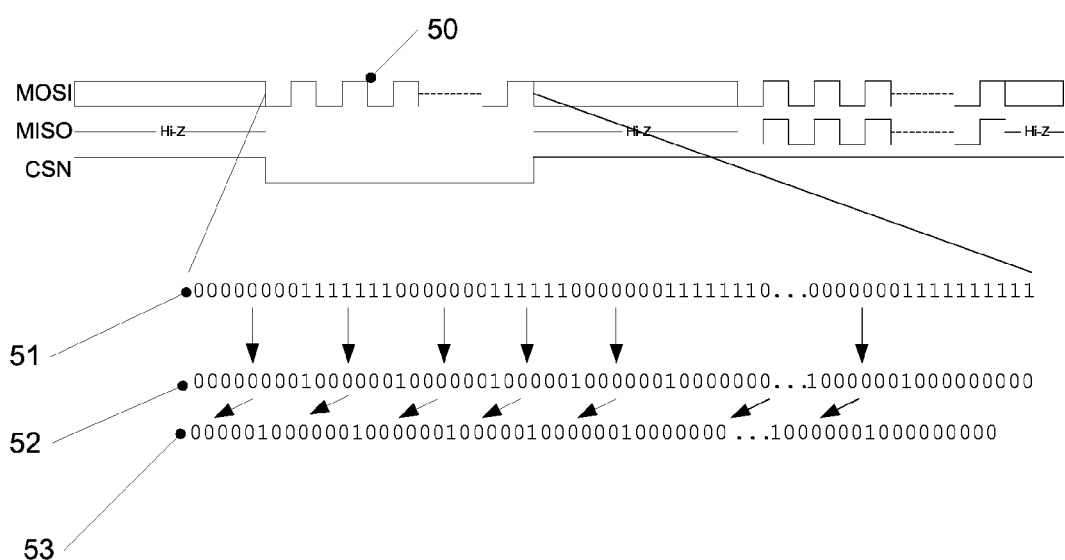
FIG. 5 is a signal diagram showing example signals for illustrating the embodiment of FIG. 4.

To illustrate the embodiment of FIG. 4 further, in FIG. 5 example signals illustrating the method of FIG. 4 are shown. These specific signals serve only illustrative purposes and are not to be construed as limiting. In particular, in other embodiments other signals may be used.

Similar to the representation of FIG. 3, signals on a MOSI line, on a MISO line and on a chip select line for activating a clockless slave device are shown. In a phase 50, a clockless slave device is activated, and a master device sends a clock message having alternating values of 0 and 1 to the clockless slave device. For example, phase 50 of FIG. 5 may correspond to phase 30 of FIG. 3.

The clock message is received at the slave device, and the slave device samples the clock message with the slave system clock, corresponding to what was explained with respect to 40 and 41 of FIG. 4. In the non-limiting example shown, the system clock of the slave device is seven times the data clock, which means that each 0 and each 1 in the clock message an average is sampled seven times before the next transition. Therefore, the sampled signal as shown in a line 51 of FIG. 5 comprises on average seven times 0 followed by seven times 1 followed by seven times 0 etc. However, as indicated also in the example of line 51 in FIG. 5, due to non-alignment of the system clock of the slave device with the data clock, sometimes eight consecutive bits may have the same value (for example, line 51 starts with eight times 0), or only six bits may have the same value consecutively (for example, the second series of ones in line 51 consists of only six ones).

Next, based on the sampled signal, edges are located, corresponding to what was explained with reference to 42 in FIG. 1. The result for the example signal of line 51 is shown in line 52. Here, the edges (i.e. transitions from 0 to 1 or from 1 to 0 in line 51) are marked with a "1", and the remaining values are set to "0".

As already mentioned with reference to 43 of FIG. 4, the thus generated signal of line 52 may be used as a send clock. In other words, in phases of data transmission, for example in phase 32 of FIG. 3, with the falling edge of the chip select signal, the slave may "start" the signal of line 52 and at every one may shift out a new data bit on the MISO line. As also mentioned, in some embodiments to compensate for a roundtrip delay the signal of line 52 may be shifted for this purpose, for example back-shifted.

Furthermore, the signal of line 52 is shifted backwards by half the duration of a data bit, as explained with reference to 44 in FIG. 4. The duration of a data bit may for example be obtained based on a distance between the edges (i.e. a distance between the "1"s in line 52) or by averaging the number of equal consecutive values in the sampled signal (i.e. number of consecutive 0s or consecutive 1s in line 51). In the example of FIG. 5, as mentioned the internal system clock of the slave device is seven times faster than the data clock. Therefore, the length of a bit in this case would be seven. A backwards shift by half the length of a bit would therefore correspond to a backwards shift by 3.5 bits of the signals of lines 51-53. As in embodiments it is only necessary to shift approximately by half the length, for example by half the length ±1 or ±0.5, the shift backwards may for example be by three bits or four bits. The result is shown in line 53. This signal may serve as a receive clock, i.e. similar to what was explained for sending data the series of 0s and 1s indicated by line 53 is started with the falling edge of the chip select signal clocked by the internal system clock, and at each "1" the value on the MOSI line is sampled. In this way, the sampling occurs approximately in the middle of each bit, allowing a reliable sampling in some embodiments.

With the embodiment of FIG. 4 as illustrated further in FIG. 5, in some cases a fast recovery of the clock, only needing a single clock message, is provided. This in some cases may be faster than conventional clock and data recovery methods, for examples approaches based on a phase locked loop (PLL) or a delay locked loop (DLL). Nevertheless, if time is not crucial, such conventional approaches may also be used.

For implementing the techniques described above for example in a conventional SPI system, only small modifications to a master device are necessary. Essentially, the master device has to be able to send a suitable clock message, and optionally to recognize the echoed clock message as a confirmation that the clock has been recovered. Such modifications may be implementable by firmware modification without the need for redesigning the hardware of the master device. Furthermore, clockless slaves and slaves requiring a clock, i.e. legacy devices, may be used together in a system as illustrated in FIG. 1.

As already mentioned, while sending to and receiving from a clockless slave, the data clock may be deactivated, i.e. not provided to a clock line (as illustratively shown in FIG. 3). This may reduce electromagnetic interference and load and may enable a system to support more slaves, in particular clockless slaves, as otherwise would be possible. In other embodiments, additionally or alternatively this may be used to increase the data rate. For example, the master device may send the clock message with a double data rate, for example using (internally) both rising or falling edges of the data clock signal. In this case, the toggling on the MOSI line and MISO lines for later data transmission would correspond to a toggling frequency of the data clock for slaves requiring the clock. Therefore, in such an embodiment the data rate may be doubled without doubling the clock rate. For example, such an increased data rate may be used to transfer more data in less time. For a 32-bit SPI system the data rate could e.g. be increased from 32 data bits per frame to 64 data bits per frame, for a same duration of 3.2 µs or 32 bits could be sent in only 1.6 µs, instead of the current 3.2 µs, in an embodiment where the clock frequency of SCLK of the SPI system is 10 MHz. These numerical values may apply to current SPI systems and may differ in other types of systems.

It should be noted that the above-described embodiments serve only as examples, and a plurality of variations and modifications are possible, some of which will be discussed below.

In FIG. 5, the various signals may be stored as a series of bits (as shown in lines 51-53). In some embodiments, the signals, in particular the signals corresponding to lines 52 and 53 used as a send clock and a receive clock, may be stored in a corresponding memory in the format shown. In other embodiments, the format for storage may differ. For example, the signals may be compressed before storage.

Furthermore, in the example of FIG. 5, the clock message is sent in during the complete phase 50, i.e. during the complete time where the chip select signal selects the slave device, and the complete message is evaluated as illustrated with respect to 51-53. In other embodiments, the message may be sent only during a part of this phase (for example only the first one, two, three, four etc. bits), and/or only a part of the message may be evaluated. To provide a clock signal for the complete later phases for sending and receiving data (for example phase 32 of FIG. 3), the thus obtained signals may then be repeated. It should be noted that this approach may lead to inaccuracies for example if the factor by which the internal system clock of the slave device is higher than the data clock is comparatively low (e.g. 4), and alignment between the internal system clock and the data clock is not present. Such errors may become less pronounced or negligible for higher factors, for example factors above 10 or above 20. On the other hand, such an approach may lead to a faster clock recovery and/or may require less storage for the recovered clock signals (for example as represented by lines 52 and 53 of FIG. 5). Depending on requirements regarding accuracy, the above-mentioned factor and storage available a suitable approach may be selected. In other embodiments, during phase 50 at the end a cyclic redundancy check may be sent, which may be ignored for purposes of recovering a clock.

In view of the variations and modifications described above, it is clear to a person skilled in the art that the described and shown embodiments are illustrative only, and are not to be construed as limiting.

What is claimed is:

1. An apparatus, comprising:
a slave device, the slave device comprising a serial data input, a serial data output and a clock recovery engine,
wherein the serial data input is configured to receive a first clock message,
wherein the clock recovery engine is configured to recover a clock based on the first clock message,
wherein the serial data input is configured to receive a second clock message after receipt of the first clock message,
wherein the serial data output is configured to output a clock recovery confirmation upon receipt of the second clock message, and
wherein the slave device is configured to utilize the recovered clock for at least one of receiving and transmitting data, while a clock message is not being received.

2. The apparatus of claim 1, wherein the clock recovery confirmation corresponds to the second clock message, and is an echo of the first clock message.

3. The apparatus of claim 1, wherein the serial data input and the serial data output are serial peripheral interface (SPI) terminals.

4. The apparatus of claim 1, further comprising a master device, the master device comprising a serial data output coupled with the serial data input of the slave device and a serial data input coupled with the serial data output of the slave device, the data output of the master device to send the first and second clock messages, and the data input to receive the clock recovery confirmation.

5. The apparatus of claim 4, wherein the master device, when communicating with the slave device, refrains from transmitting a clock signal.

6. The apparatus of claim 4, wherein the master device further comprises a clock output, the apparatus further comprising a further slave device, the further slave device comprising a clock input coupled to the clock output of the master device.

7. A device, comprising:
a serial data input, and
a clock recovery engine,
wherein the clock recovery engine is configured to:
  receive a clock message via the serial data input, the clock message being based on a data clock,
  sample the clock message with a system clock, the system clock having a higher clock rate than the data clock,
  locate edges in the sampled clock message, and
  use the located edges as a send clock, wherein the clock recovery engine is further configured to:
  shift the located edges by half a duration of a bit of the clock message, and
  use the shifted located edges as a receive clock.

8. The device of claim 7, wherein the clock recovery engine is further to shift the located edge prior to using them as send clock.

9. The device of claim 7, wherein the clock message comprises alternating values corresponding to logic 0 and corresponding to logic 1.

10. The device of claim 7, wherein the device is a serial peripheral interface (SPI) slave.

11. The device of claim 7, wherein the device further comprises a serial data output,
the serial data input further configured to receive a further clock message, and the serial data output to output a confirmation message upon receiving the further clock message.

12. A method, comprising:
receiving a clock message at a slave device,
determining a clock based on the received clock message at the slave device, wherein determining a clock comprises:
  sampling the clock message with a slave system clock,
  locating edges in the sampled clock message,
  providing a send clock based on the located edges, and
  shifting the located edges to provide a receive clock, wherein shifting the located edges comprises shifting the located edges by half a duration of a bit of the clock message, and
using the shifted located edges as a receive clock.

13. The method of claim 12, further comprising, after the determining of a clock, receiving a further clock message at the slave device, and sending a confirmation message based on the determined clock simultaneously to the receiving of the further clock message.

14. The method of claim 13, wherein the confirmation message corresponds to the further clock message.

15. The method of claim 12, wherein providing a send clock comprises shifting the located edges to compensate for a loop delay.

16. The method of claim 12, wherein the slave device is a serial peripheral interface (SPI) slave device.

17. The apparatus of claim 1, wherein the output of the clock recovery confirmation upon receipt of the second clock message comprises output of the clock recovery confirmation essentially at the same time as receipt of the second clock message.

18. The apparatus of claim 17, wherein output of the clock recovery confirmation essentially at the same time as receipt of the second clock message comprises output of the clock recovery confirmation during a same time slot as receipt of the second clock message.

* * * * *